United States Patent
Kimura et al.

(10) Patent No.: US 6,801,382 B2
(45) Date of Patent: Oct. 5, 2004

(54) MAGNETIC DISK STORAGE APPARATUS

(75) Inventors: Reiichi Kimura, Takasaki (JP);
Yasuhiko Kokami, Takasaki (JP);
Kunihiro Kawauchi, Fujioka (JP);
Minoru Kurosawa, Tano (JP); Kichiya Itagaki, Isesaki (JP)

(73) Assignees: Renesas Technology Corp., Tokyo (JP); Hitachi Tohbu Semiconductor, Ltd., Tokyo (JP)

( * ) Notice: Subject to any disclaimer, the term of this patent is extended or adjusted under 35 U.S.C. 154(b) by 299 days.

(21) Appl. No.: 10/123,245

(22) Filed: Apr. 17, 2002

(65) Prior Publication Data
US 2002/0181137 A1 Dec. 5, 2002

(30) Foreign Application Priority Data
May 31, 2001 (JP) ........................................ 2001-164314

(51) Int. Cl.$^7$ ............................................. G11B 15/46
(52) U.S. Cl. ..................... 360/73.03; 318/254; 318/439
(58) Field of Search ........................... 360/73.01, 73.03, 360/71, 69; 318/254, 439, 599, 721, 720, 700; 388/928.1, 825, 834, 811, 819

(56) References Cited

U.S. PATENT DOCUMENTS 5,455,885 A * 10/1995 Cameron ..................... 388/834
6,504,328 B1 * 1/2003 Gontowski, Jr. ............ 318/254

FOREIGN PATENT DOCUMENTS

| JP | 9-37584 | 2/1997 |
| JP | 11-75388 | 3/1999 |
| JP | 11-341861 | 12/1999 |
| JP | 11-341870 | 12/1999 |
| JP | 2000-166280 | 6/2000 |

* cited by examiner

Primary Examiner—Andrew L. Sniezek
(74) Attorney, Agent, or Firm—Miles & Stockbridge P.C.

(57) ABSTRACT

Currents of sine waveforms can be fed through coils by a relatively small-sized circuit, and thereby, highly dense magnetic storage can be realized with less rotation variations and a driving control circuit of a motor rotating at a low noise level can be provided. A coil of one phase of a three-phase brushless motor is driven with full amplitude at which an applied voltage becomes equal to a source voltage, and a coil of one of other phases is driven with gradually changing voltages so that a current of sine waveform is delivered, and a coil of the remaining phase is driven by feedback control so that a total current flowing through all coils becomes a predetermined current value.

9 Claims, 13 Drawing Sheets

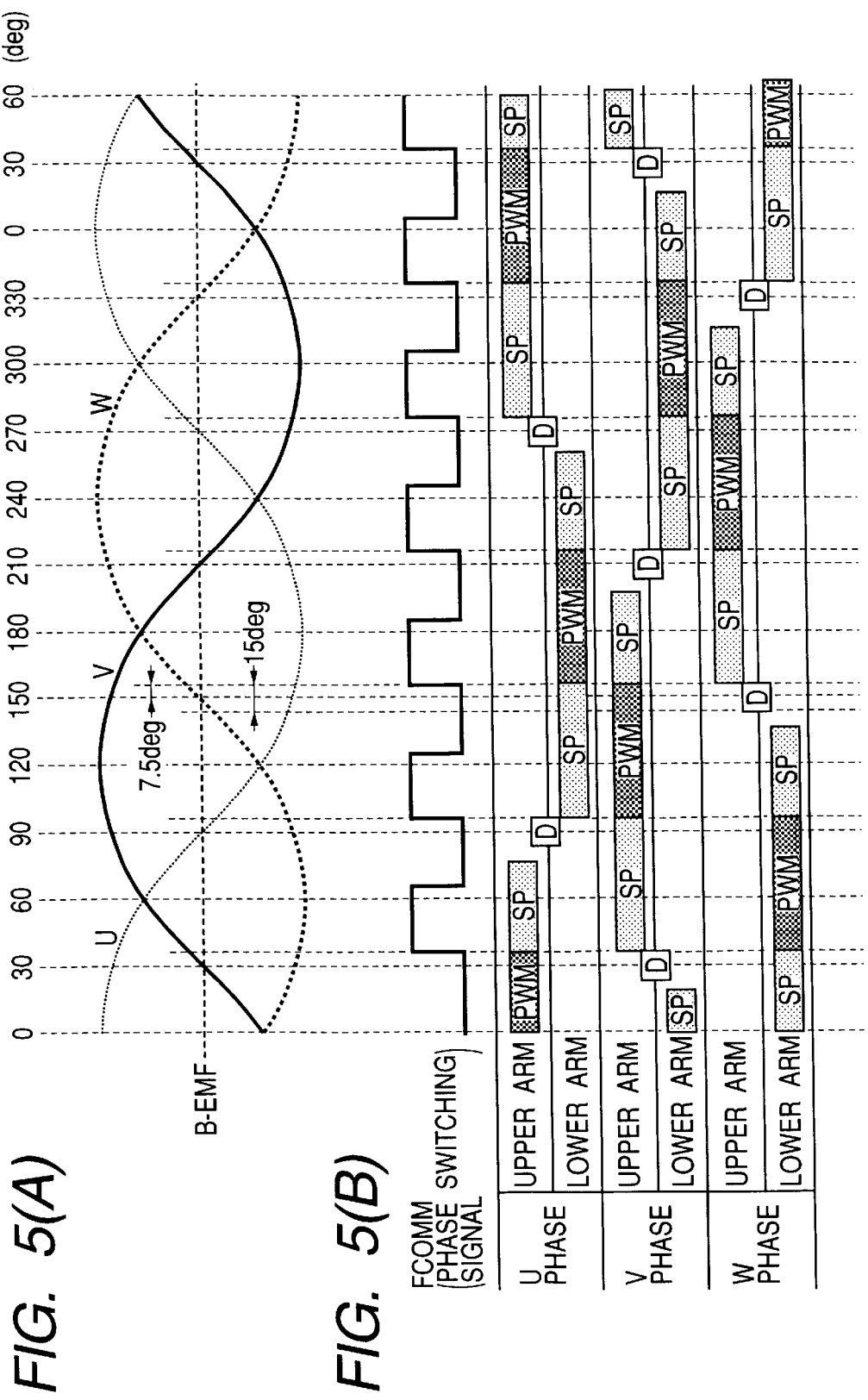

FIG. 13(A) CURRENT INDICATION VALUE (SPNCRNT)

MAGNETIC DISK STORAGE APPARATUS

BACKGROUND OF THE INVENTION

The present invention relates to technology for driving control of a brushless motor, and more particularly to technology effectively applied to the formation of rotation drive current waveforms of the motor. The present invention relates to technology effectively applied to a driving control apparatus of a spindle motor for rotationally driving disk type storage media as in, e.g., a hard disk drive.

A hard disk drive is demanded to have the ability to read and write information from and to magnetic disk as fast as possible, that is, the ability to make access at high speed. To achieve this, it is important to speed up disk rotation. Conventionally, a brushless DC multi-phase motor called a spindle motor has been generally used to rotate magnetic disk in a hard disk drive. The magnetic disk is fast rotated by the spindle motor and a magnetic head for read and writing is brought near to the surface of the rotating magnetic disk to write or read information while moving in a radius direction thereof.

In rotation driving control of a conventional spindle motor, a rotor has been rotated by supplying coils of individual phases with square-wave pulse currents as shown in FIG. 15 that are out of phase with one another, by a driving circuit. FIG. 15 shows the waveform of current fed through one of three phases; currents having waveforms that are 120 degrees out of phase with one another are fed through other two phases. Such a rotation driving method based on square-wave pulse currents has the advantage of easy current formation but also the disadvantage of causing rotation variations and noise due to torque ripple. It is known that a brushless motor can be rotated without causing rotation variations and noise by using drive current waveforms of sine waveforms. Accordingly, an invention is proposed which smoothly rotates a rotor by feeding pulse currents of sine waveforms through coils of individual phases (Japanese Published Unexamined Patent Application No. Hei 9(1997)-37584).

SUMMARY OF THE INVENTION

However, in the above described technology, plural units of waveform information of one cycle of current waveforms to be formed are stored in ROM (read only memory), depending on the load on the motor, and when a user selectively specifies one of them, the specified waveform information is read out to control coil drive currents, whereby currents of desired sine waveforms are outputted. As a result, the amount of hardware increases, and even if the load on the motor changes, since the duty of basic clock to form coil drive waveforms remains constant, phase switching of output currents cannot be smoothly performed in response to an increase or decrease in the output currents. This fact has been revealed by the present inventors.

An object of the present invention is to provide a magnetic disk unit that can feed currents of sine waveforms through coils by a relatively small-sized circuit, and thereby, enables highly dense magnetic storage with less rotation variations and has a spindle motor rotating at a low noise level.

Another object of the present invention is to provide a magnetic disk unit that can smoothly change output currents in response to changes in the load on a motor, and thereby, enables highly dense magnetic storage with less rotation variations and has a spindle motor rotating at a low noise level.

The above described objects and other objects and characteristics of the present invention will become apparent from the description of this specification and the accompanying drawings.

Typical ones of intentions disclosed by the present patent application will be briefly described below.

A magnetic disk storage apparatus of this invention comprises: a first motor for rotating magnetic disk; a magnetic head for reading information from recording tracks on the magnetic disk; and a first motor driving control circuit for controlling drive currents of the first motor, wherein the first motor is a multi-phase brushless motor in which the potential of a center tap of the multi-phase brushless motor is made to be floating, and a driving control circuit of the first motor performs driving by feedback control so that a coil of one of the phases is driven with a full amplitude at which an applied voltage becomes equal to a source voltage, a coil of a second phase is driven with gradually changing voltages so that a current of sine waveform is delivered, and a third coil is controlled so that a total current flowing through all coils becomes a predetermined current value.

According to the above described means, motor coils can be driven according to sine waveforms without causing power loss, whereby disk rotation variations are reduced, highly dense magnetic storage is enabled, and the motor can rotate at a low noise level.

Preferably, the first motor driving control circuit is provided with an arithmetic circuit that produces by predetermined operations a signal driven with gradually changing voltages so that a current of sine waveform is delivered. Accordingly, in comparison with the method of holding all data corresponding to sine waveforms in memory, a circuit scale can be made smaller and the magnetic disk storage apparatus can be miniaturized.

Moreover, the first motor driving control circuit is constructed to produce as a PWM signal a signal driven with gradually changing voltages so that a current of sine waveform is delivered. A driving method based on the PWM signal enables less power loss than a driving method based on linearly changing currents.

The first motor driving control circuit is constructed to produce as a PWM signal a signal driven with the feedback control. Use of the PWM signal can reduce power loss and enables still less rotation variations because it can be driven with currents corresponding to changing loads.

Moreover, coil currents fed through coils of individual phases by the first motor driving control circuit are formed to have phases that are an predetermined electrical angle corresponding to coil inductance and internal resistance ahead of the phases of back electromotive forces induced in the coils. Accordingly, the motor can be rotated with the greatest driving torque.

Moreover, the first motor driving control circuit drives coils of individual phases so that phase switching timing is off zero-cross points of the back electromotive forces. Thereby, in the case where phase switching control is performed by detecting zero-cross points of back electromotive forces, the detection of incorrect zero-cross points due to noise generated in the coils during phase switching can be prevented, so that highly accurate rotation control can be performed.

The first motor driving control circuit produces signals driven with gradually changing voltages by identical operations even if phases driven by the signals are different from each other so that currents of sine waveforms are delivered. By producing drive control signals of all phases by identical operations, circuit configuration and arithmetic programs can be simplified.

Moreover, in a magnetic disk storage apparatus comprising the first motor driving control circuit and a controller controlling the first motor driving control circuit, the first motor driving control circuit is constructed to perform control so that the total of currents fed through the coils of the phases matches a current indication value supplied from the controller, and a current indication value correcting circuit is provided which corrects the current indication value, taking into account fluctuations of the total current produced by the currents fed through the coils of the phases being changed according to sine waveforms. Accordingly, reaction of the control system to ripples of coil current resulting from driving the motor with a sine waveform can be weakened, with the result that torque ripples can be reduced and rotation variations can be further lessened.

BRIEF DESCRIPTION OF THE DRAWINGS

FIG. 5 is a timing diagram showing a mutual relationship of driving modes of coils of individual phases of a three-phase motor and a switching timing;

DESCRIPTION OF THE PREFERRED EMBODIMENTS

Hereinafter, preferred embodiments of the present invention will be described with reference to the accompanying drawings.

Figure 1:
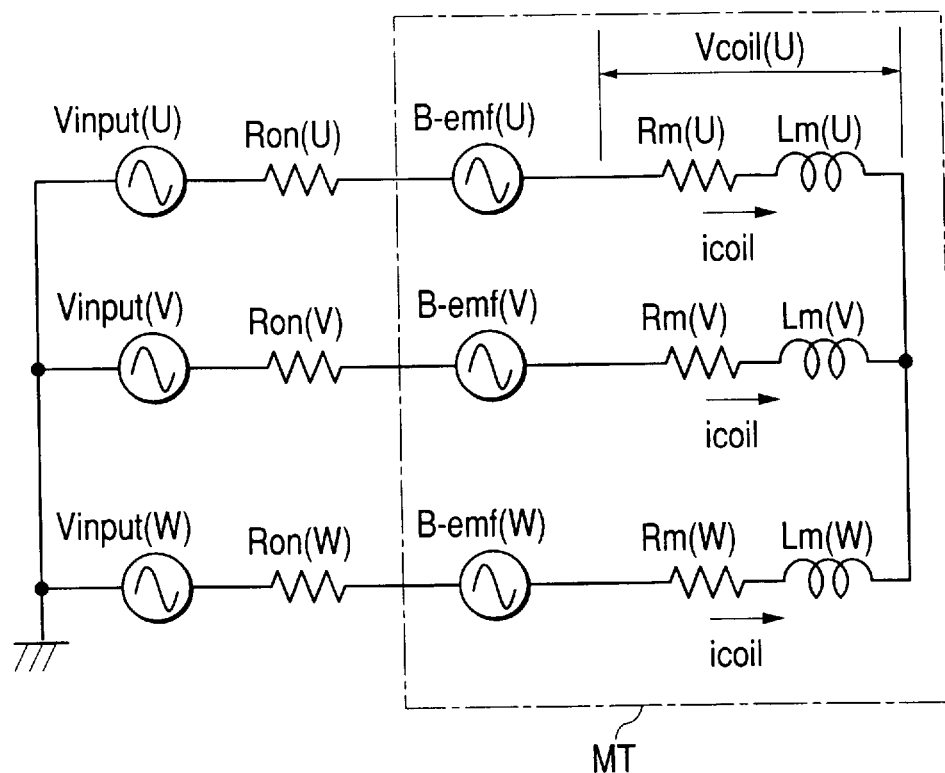
FIG. 1 shows a driving circuit in a three-phase brushless motor to which the present invention is effectively applied, and an equivalent circuit of the motor.

Before describing specific embodiments of the present invention, a driving principle of motor coils of the present invention will be described using FIGS. 1 to 3. FIG. 1 shows a driving circuit in a three-phase brushless motor and an equivalent circuit of the motor. In FIG. 1, Lm(U), Lm(V), and Lm(W) respectively denote stator coils of three phases U, V, and W phases of a motor MT. Rm(U), Rm(V), and Rm(W) respectively denote internal resistances of phase coils Lm(U), Lm(V), and Lm(W). B-emf(U), B-emf(V), and B-emf(W) respectively denote back electromotive forces of the phase coils Lm(U), Lm(V), and Lm(W). Ron(U), Ron (V), and Ron(W) respectively denote on resistances of output transistors making up a phase current output circuit that feeds currents through the coils Lm(U), Lm(V), and Lm(W). Vinput (U), Vinput (V), and Vinput(W) respectively denote drive voltage sources applied to the coils.

Figure 3A:
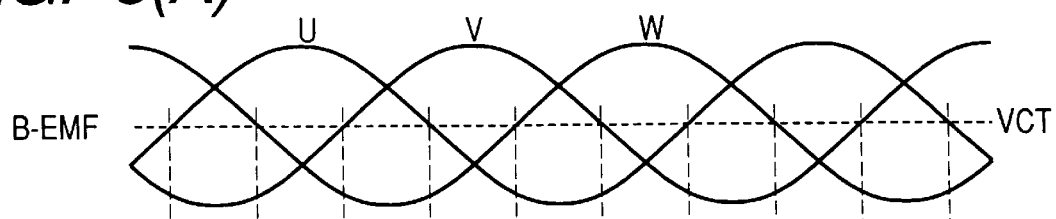
FIG. 3 is a diagram showing a phase relationship among back electromotive force B-EMF developed in coils Lm(U), Lm(V), and Lm(W) in the equivalent circuit of FIG. 1, coil voltage Vcoil applied across the coils, and applied voltage Vinput by the coil drive voltage sources Vinput(U), Vinput (V), and Vinput(W)
Figure 3B:
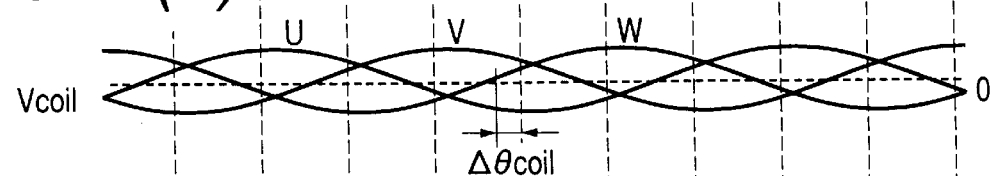

FIG. 3 shows a phase relationship among waveforms of back electromotive forces B-EMF developed in the coils Lm(U), Lm(V), and Lm(W) in the equivalent circuit of FIG. 1, coil voltage Vcoil applied across the coils, and applied voltage Vinput by the coil drive voltage sources Vinput(U), Vinput(V), and Vinput(W). When AC drive currents with the same phase as the back electromotive forces B-EMF are fed through the coils, the greatest torque is obtained.

However, even if drive voltages with the same phase as the back electromotive forces B-EMF are applied to the coils, a phase lag occurs in currents Icoil actually flowing through the coils because of internal resistance of the coils. Accordingly, as shown in FIG. 3, it is desirable that coil voltage Vcoil of each phase is applied so that its phase is $\Delta\theta$ coil ahead of that of the back electromotive forces B-EMF developed in the coils Lm(U), Lm(V), and Lm(W), to match the phase of coil current Icoil to that of the back electromotive forces B-EMF. Since voltages Vinput applied by the drive voltage sources Vinput(U), Vinput(V), and Vinput(W) from outside the coils are also out of phase with the coil voltages Vcoil of the individual phases, phase differences must be considered to decide the phases of the drive voltage sources Vinput(U), Vinput(V), and Vinput(W).

A phase lead amount $\Delta\theta$ coil of the coil voltage Vcoil with respect to the phase of the back electromotive forces B-EMF is represented by the following expression (1).

$$\Delta\theta \text{coil} = \tan^{-1}(\overline{\omega \cdot Lm/Ron+Rm}) = \tan^{-1}\{(2\pi \cdot fB\text{-}EMF) \cdot Lm/(Ron+Rm)\} \quad (1)$$

$\Delta\theta$coil varies in value, depending on a motor used. In the expression (1), Lm denotes coil inductance and fB-EMF denotes the frequency of the back electromotive force B-EMF, that is, a required number of revolutions of a motor.

Figure 2:
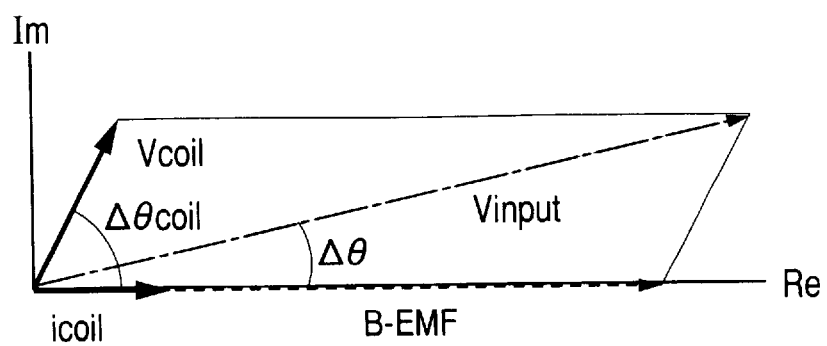
FIG. 2 illustrates vector representation of applied voltage Vinput, coil voltage Vcoil, and back electromotive force B-EMF.

Next, assuming that a difference between the phase of the back electromotive forces B-EMF of the coils and the phase of the drive voltage sources Vinput(U), Vinput(V), and Vinput(W) is $\Delta\theta$, the above described applied voltage Vinput is given as a synthetic vector of the coil voltage Vcoil and the back electromotive forces B-EMF that are represented by vector, as shown in FIG. 2. Hence, if inductance Lm and internal resistance Rm of the coils are determined from the motor used, a phase difference $\Delta\theta$coil can be derived from the expression (1) and $\Delta\theta$ can be obtained from a vector diagram of FIG. 2. Accordingly, if drive waveforms are formed by setting the phases of the drive voltage sources Vinput(U), Vinput(V), and Vinput(W) to be $\Delta\theta$ ahead of that of the back electromotive forces B-EMF, the greatest torque can be obtained. The phase of the back electromotive forces B-EMF developed in the coils can be obtained by detecting a zero-cross point of the back electromotive forces.

In a motor driving circuit of an embodiment described below, an output transistor is controlled so that drive voltage waveforms of the phase relationship as described above are applied to coils. Moreover, the output transistor is controlled by a PWM (pulse width modulation) system. In other words, a gate terminal of the output transistor is controlled by a PWM-controlled signal (pulse), whereby drive voltage waveforms of the above described phase relationship are applied to the coils.

Figure 3C:
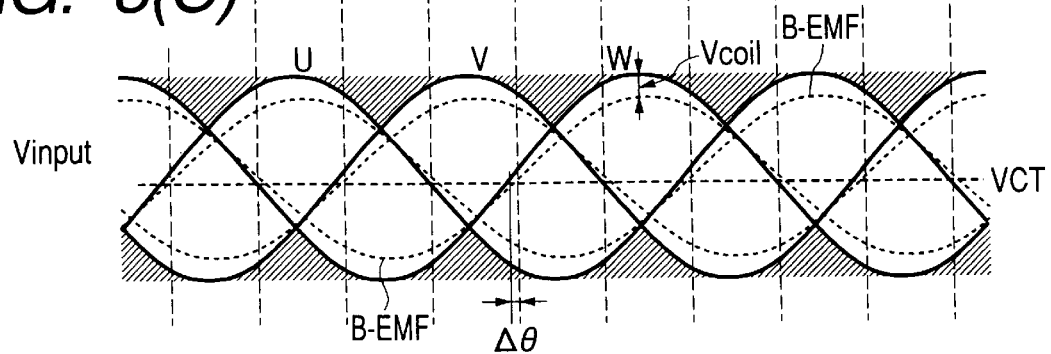

As described previously, drive voltage waveforms applied to the coils are desirably sine waveforms and their phases desirably have a timing as shown in FIG. 2. However, even if the coils are driven so as to satisfy the above condition, when the drive voltage waveforms shown in FIG. 3C are formed, if potential VCT of center tap CT, which is a common connection terminal of coils of three phases, is kept constant and sine waveforms with the potential VCT as a center potential are formed and applied to the coils, power loss will occur in a portion hatched in FIG. 3C.

Figure 4A:
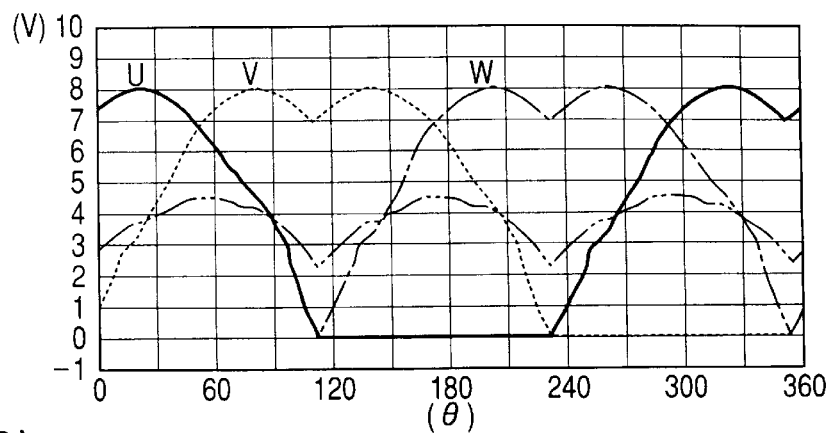
FIG. 4 is a diagram showing an example of drive waveforms applied to individual phases of a three-phase brushless motor by a motor driving control circuit to which the present invention is applied.
Figure 4B:
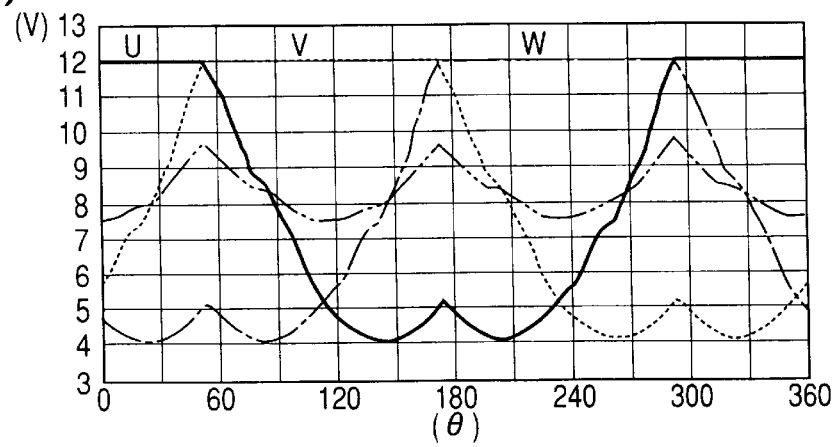

Accordingly, to reduce the power loss, we thought that a potential VCT of the center tap CT is set to be not fixed but floating so that a coil drive voltage around a portion in which a drive waveform of each phase swings to its maximum amplitude is forcibly set to a source voltage Vcc or ground potential GND (=0V). FIG. 4A shows a waveform produced when a coil drive voltage around a portion in which a drive waveform of each phase swings to its maximum amplitude is forcibly set to the source voltage GND (=0V). FIG. 4B shows a waveform produced when a coil drive voltage around a portion in which a drive waveform of each phase swings to its maximum amplitude is forcibly set to the source voltage Vcc.

It will be understood from FIG. 4 that the case (A) of FIG. 4 eliminates power loss at a lower hatched portion in FIG. 2C and the case of (B) eliminates power loss at an upper hatched portion in FIG. 2C. Accordingly, by using the drive waveforms of FIG. 4A or FIG. 4B, higher power efficiency can be obtained than the case where a potential VCT of the center tap CT is fixed to drive the coils with sine waveforms as shown in FIG. 3C. In FIGS. 4A and 4B, it is because a potential VCT of the center tap CT floats that waveforms at portions not set to Vcc or GND appear to be not sine waveforms. Use of the potential VCT of the center tap CT as reference, that is, differences between the potential VCT of the center tap CT and the potential of individual waveforms tell that the drive waveforms change according to sine waveforms.

Figure 4C:
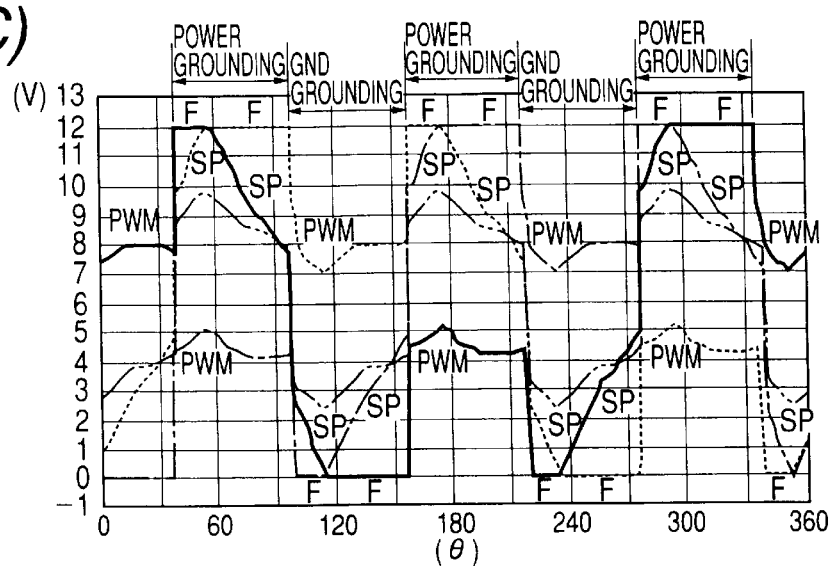

In this embodiment, the above described driving system is further advanced to the system of using waveforms as shown in FIG. 4C for driving. Employing this system contributes to simplification of hardware configuration. Waveforms of FIG. 4C are formed by combining waveforms cut from portions from 0 to 37.5 degrees, 97.5 to 157.5 degrees, 217.5 to 277.5 degrees, and 337.5 to 360 degrees from FIG. 4A and portions of 37.5 to 97.5 degrees, 157.5 to 217.5 degrees, and 277.5 to 337.5 degrees from FIG. 4B.

Cutting is not performed in units of 60 degrees such as 0 to 60 degrees, 60 to 120 degrees, 120 to 180 degrees, and 180 to 240 degrees, and so forth. This is because, as seen from FIG. 1, 60, 120, 180, 240, and 300 degrees are respectively zero-cross points of back electromotive force, and in this embodiment, as described later, since zero-cross points of back electromotive force of the coils are detected to perform driving control, switching of currents of individual phases at such positions causes noise to occur in back electromotive force, disabling correct detection of zero-cress positions.

Next, a description will be made of a specific method of forming the drive waveforms as shown in FIG. 4. In FIG. 4C, the symbols "SP", "PWM", and "F" provided in the vicinity of a waveform of each phase indicate the type of a method of forming each waveform. A different symbol indicates a different formation method. Hereinafter, a method of forming each waveform will be described in order.

First, a waveform marked with the symbol "F" is formed by forcibly driving an output transistor into a full amplitude level. Specifically, the output transistor driving a coil of a phase corresponding to a waveform marked with the symbol "F" is applied with a control signal of high level to its gate terminal continuously for a required time (corresponding to the length of the F waveform), thereby applying Vcc (e.g., 12V) or GND (0V) to a driving terminal of the coil.

Next, a waveform marked with the symbol "SP" is produced by operations in an arithmetic circuit and formed by the output transistor being driven by a PWM-controlled signal. As shown in FIG. 4, waveforms marked with "SP" exist two for each of a right upward direction and a right downward direction in a range of an electrical angle 60 degrees cut as described previously, and are of identical shape or vertically symmetric shape. Therefore, they are produced by only two arithmetic expressions. If only waveforms of a right upward direction and a right downward direction are formed by operations, other waveforms or part of waveforms can be formed by feedback control based on current detection or full amplitude driving of the output transistor.

Thereby, in comparison with the conventional system of forming waveforms throughout 360 degrees according to ROM data, the system of this embodiment forms waveforms more easily and reduces the amount of hardware. A specific example of an operation method by an arithmetic circuit will be described in detail later; for waveforms marked with the symbol "SP", PWM signals are formed which turn the output register on or off by 16 or 32 pulses within a range of an electrical angle 60 degrees. Specifically, pulse width is controlled to become gradually wider for right upward portions and gradually narrower for right downward portions.

FIG. 5B shows by which of "F", "PWM", and "SP" methods output transistors driving coils of three phases U, V, and W in which back electromotive force B-EMF changes as indicated by (A) form waveforms at a proper timing. In the drawing, "upper arm" denotes a transistor of the power voltage Vcc side of an output transistor of a corresponding phase, and "lower arm" denotes an output transistor of the GND side. A box that is described across the boundary between "upper arm" and "lower arm" and marked with the symbol "D" denotes that both an output transistor of the Vcc side and an output transistor of the GND side are turned off.

The reason that periods are thus provided in which both an output transistor of the Vcc side and an output transistor of the GND side are turned off is to eliminate influence of drive voltages applied to coils when zero-cross points of back electromotive forces are detected, in order that only the back electromotive forces are observed to detect the zero-cross points.

Figures 6A, 6B:
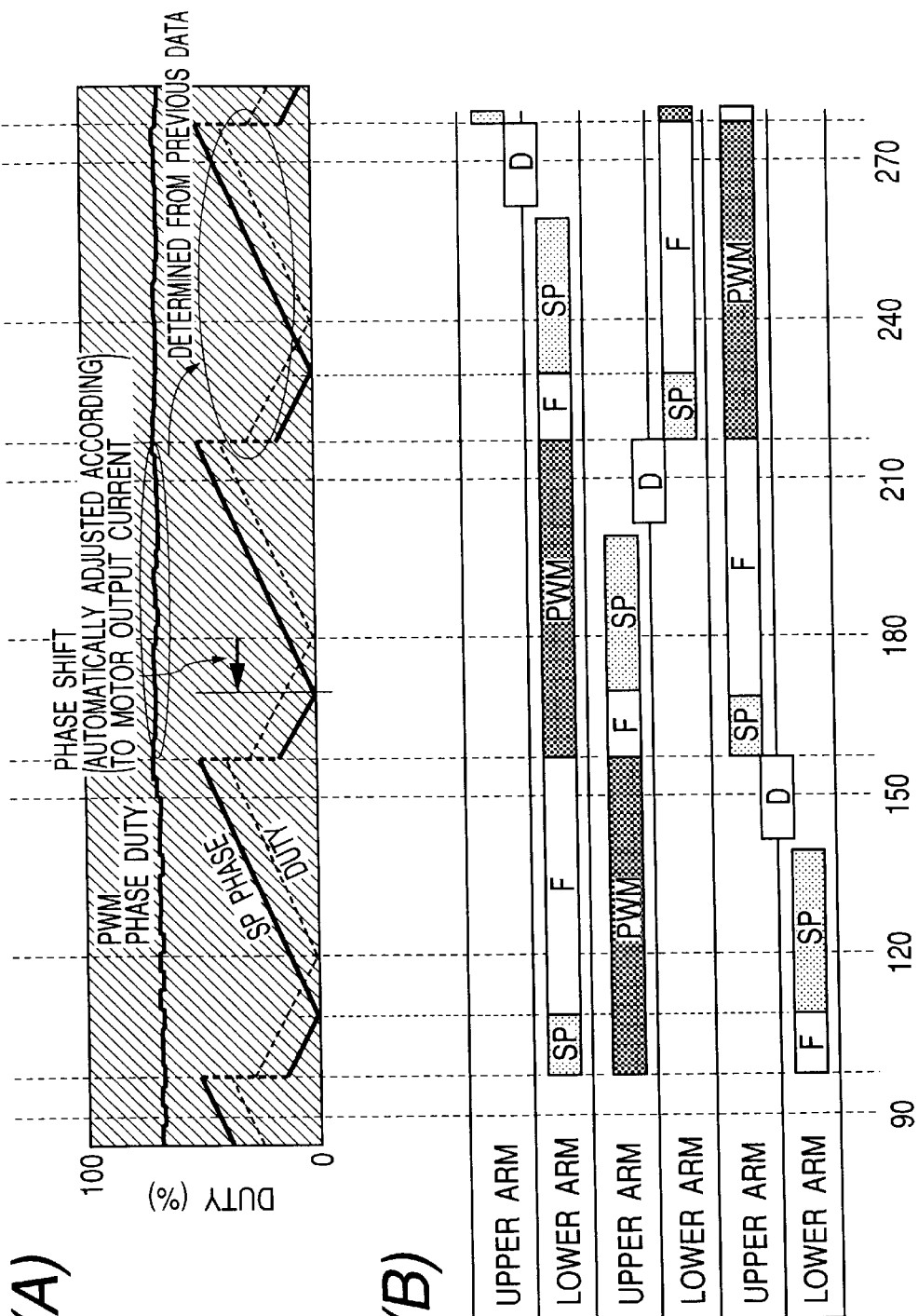
FIG. 6 is a timing diagram enlarging a range from 90 to 270 degrees of FIG. 5 to show a mutual relationship of driving modes of coils of individual phases, a switching timing, and duty changes of SP phase.

FIG. 6A is an enlarged view of duty changes of pulses of a signal for driving an output transistor of PWM phase subjected to feedback control based on current detection in a portion of 90 to 270 degrees of FIG. 5 showing waveforms in a range from 0 to 360 degrees and duty changes of pulses of a signal for driving an output transistor of SP phase controlled by operations in an arithmetic circuit. The duty control applies to not all cases and phases are automatically adjusted as shown by the arrow A according to the magnitude of output current. The phase adjustment is made based on coil current values detected in the range of the first preceding 60 degrees. FIG. 6B is an enlarged view of a portion from 90 to 270 degrees of FIG. 5B showing the timings of waveform forming methods in the range from 0 to 360 degrees.

Next, a waveform marked with "PWM" is formed based on a current detection and current comparison function of a motor driving control circuit of the embodiment. Specifically, the motor driving control circuit of the embodiment is provided with a current detection resistor RNF provided so that the sum of currents flowing through three coils Lu, Lv, and Lw flows to detect a total of them, and a current detection differential amplifier that detects a potential difference across the current detection resistor RNF to detect the magnitude of current. To control an output current, a PWM signal is produced which detects a difference between a coil current value detected by the current detection differential amplifier and a current indication value supplied from a controller (CPU) (not shown) and drives the output transistors so that the difference is 0.

For example, when a detected current is smaller than the current indication value, the duty of the PWM signal is increased to allow more current to flow through the coils, while, when the detected current is larger than the current indication value, the duty of the PWM signal is reduced to decrease current flowing through the coils. By repeating this operation, a waveform marked with the symbol "PWM" is formed. Duty control of the PWM signal is performed based on the magnitude of output current detected in the preceding cycle. Thereby, the phase of duty control of the PWM signal, that is, the phase of sawtooth waveform of FIG. 6A is automatically adjusted according to an output current detected in the preceding cycle.

Furthermore, in this embodiment, waveforms in the range of electrical angle 60 degrees are formed by, e.g., 16 PWM pulses. In other words, the output transistors are turned on and off 16 times by 16 pulses formed when a rotor rotates by an electrical angle of 60 degrees, and the respective widths of the 16 pulses are changed according to the detected current value, whereby waveforms marked with the symbol "PWM" are formed. Since such drive pulse feedback control based on current detection has been performed by a motor driving control circuit of the conventional PWM control system as well, a drive waveform applied to any one coil of three phases by the same circuits and procedure as conventional ones.

Figure 7:
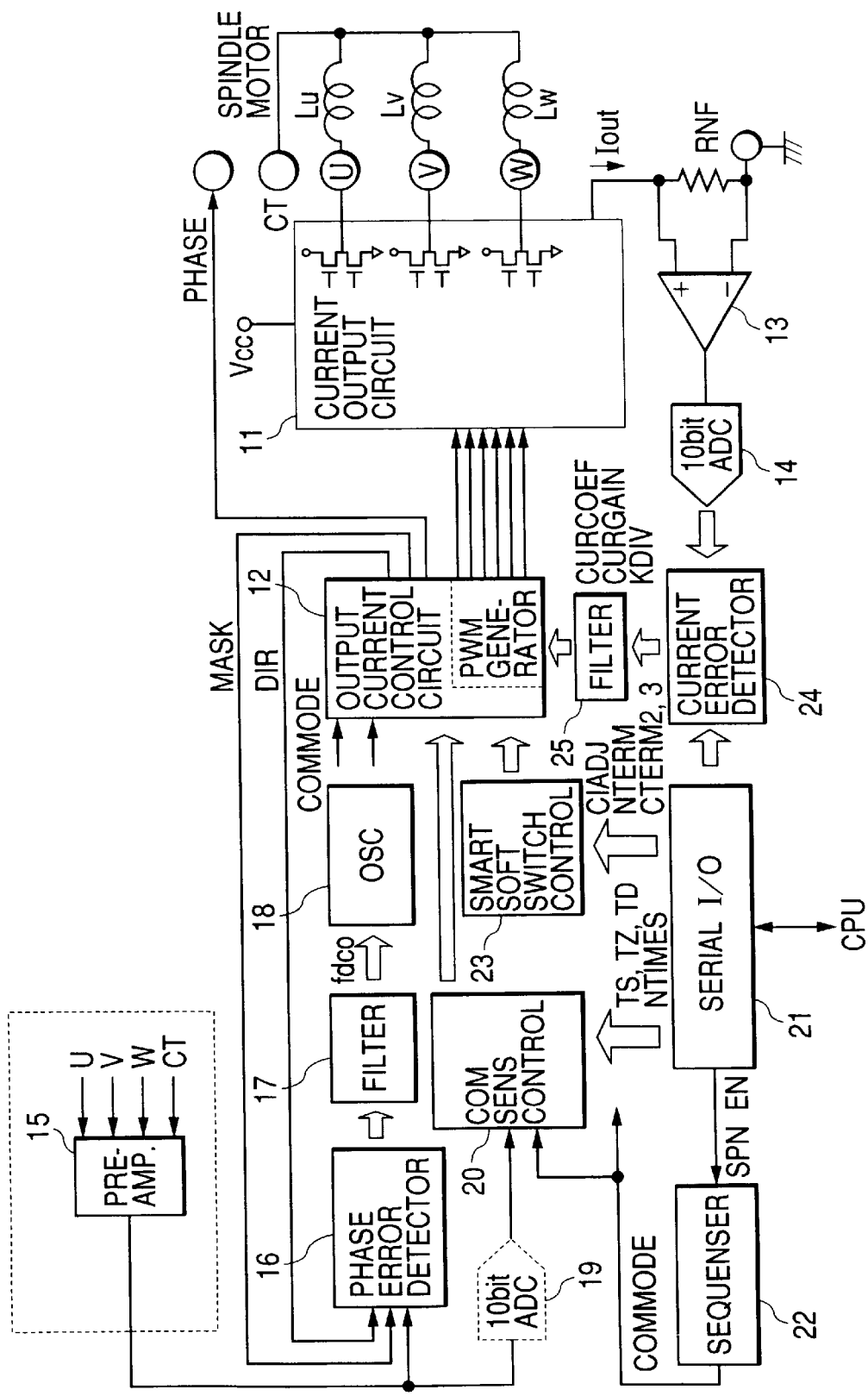
FIG. 7 is a block diagram showing one embodiment of a driving control circuit of a three-phase brushless motor to which the present invention is applied.

FIG. 7 shows an embodiment of the present invention effectively applied to a driving control circuit of a spindle motor used in a hard disk storage apparatus. The whole circuit shown in FIG. 7 is formed on one semiconductor substrate such as a single-crystal silicon, except coils Lu, Lv, and Lw of the motor.

In FIG. 7, the reference numeral 11 designates a current output circuit successively feeding current to the coils Lu, Lv, and Lw of a three-phase brushless motor; 12, an output current control circuit that produces a PWM signal for controlling an output current and supplies it to the current output circuit 11; RNF, a current detection resistor connected to the current output circuit 11 so that the sum of currents flowing through the three coils Lu, Lv, and Lw flows to detect a total of them; 13, a current detection differential amplifier that detects a potential difference across the current detection resistor RNF to detect the magnitude of current; and 14, an AD conversion circuit that performs AD conversion for an output voltage of the current detection differential amplifier to produce a digital signal.

Reference numeral 15 designates a back electromotive force detecting circuit that detects back electromotive forces of the coils Lu, Lv, and Lw developing in output terminals u, v, and w of the current output circuit 11, and center tap CT to output a signal indicating a zero-cross point; 16, a phase difference detecting circuit that detects a phase difference between a signal indicating a zero-cross point of back electromotive force outputted from the back electromotive force detecting circuit 15 and a signal indicating a zero-point of an output current outputted from the output current control circuit 12; 17, a loop filter that performs phase compensation of a main line; and 18, an oscillation circuit that oscillates at a frequency (about 100 kHz) corresponding to a value (digital code) of the loop filter 17. An output of the oscillation circuit 18 is used as a reference clock for producing the PWM signal in the output current control circuit 12.

PLL (phase locked loop) is formed by a feedback route established by the phase difference detecting circuit 16, loop filter 17, oscillation circuit 18, output current control circuit 12, and phase difference detecting circuit 16 back from the output current control circuit 12. The PLL controls oscillation operation of the oscillation circuit 18 so that the phase of a signal indicating a zero-cross point of back electromotive force outputted from the back electromotive force detecting circuit 15 matches the phase of a signal outputted from the output current control circuit 12, thereby locking the frequencies of voltage waveforms (1 to 2 kHz) applied to the coils.

Reference numeral 19 designates an AD conversion circuit that performs AD conversion for a back electromotive force outputted from the back electromotive force detecting circuit; 20, a conduction start control circuit that decides a conduction start phase, based on a back electromotive force induced in a nonconduction phase and detected by the back electromotive force detecting circuit 15 when a short pulse to which the rotor does not respond is fed from one phase to another by the current output circuit 11, based on an output of the AD conversion circuit 19 when the motor is standing; 21, a serial port that sends and receives data to and from a microcomputer (CPU) (not shown).

The serial port 21 receives a serial clock SCLK supplied from the CPU, a current indication value of a spindle motor, and information about an operation mode, and produces control signals inside the driving control circuit, based on received mode information.

Reference numeral 22 designates a sequencer that controls the whole of circuits shown in FIG. 7; 23, an arithmetic circuit that produces a duty control signal for forming drive waveforms of SP phase; 24, a current difference detecting circuit that detects a difference between a coil current value detected by the current detection differential amplifier 13 and a current indication value supplied via the serial port 21 from the CPU; and 25, a filter that produces a value corresponding to a current difference detected based on an output of the current difference detecting circuit 24 while making phase compensation. Current difference information outputted from the filter 25 and waveform information produced in the arithmetic circuit 23 are supplied to the output current control circuit 12, where a PWM signal is produced to drive the output transistors and supplied to the current output circuit 11 to control output currents to be fed to the coils.

Output current Iout is represented by $$Iout = \{(Vcc \times Duty) - Bemf\}/RL$$

where Duty is the duty (ratio of pulse width to one cycle) of PWM signal, Bemf is coil back electromotive force, and RL is coil resistance. Accordingly, changes of PWM signal cause coil output current Iout to be controlled according to the above expression.

Next, a more specific method of producing waveforms (hereinafter referred to as waveforms of SP phase) marked with the symbol SP in FIG. 4C will be described using FIG. 8.

Figure 8A:
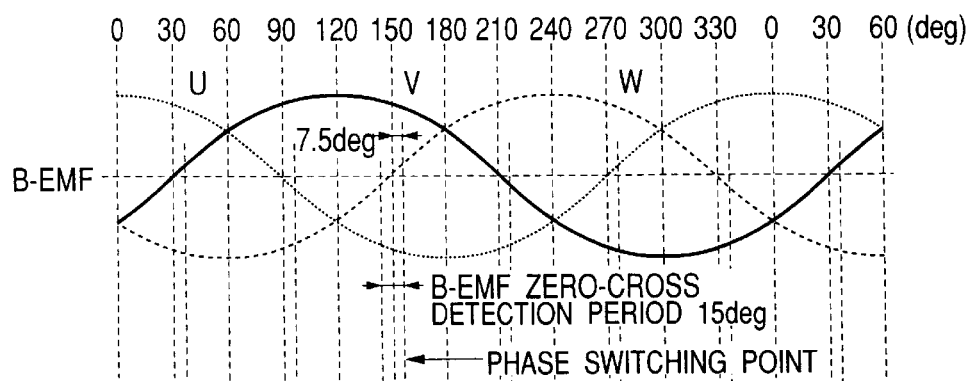
FIG. 8 is a pattern diagram showing duty production patterns of SP phase in the motor driving control circuit of the embodiment of FIG. 7.
Figure 8B:
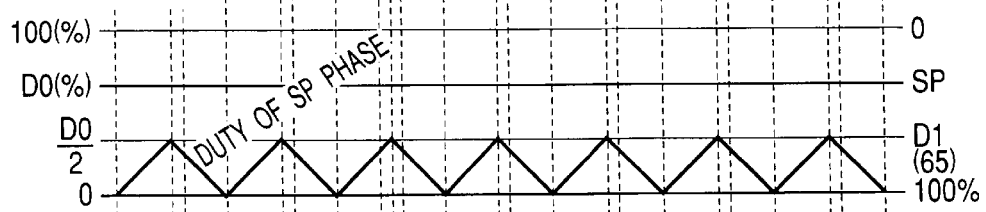

First, a description is made of the case where coil back electromotive force B-EMF and coil voltage Vcoil are not out of phase with each other. Suppose that an output current and a current indication value from the CPU match and the duty of a control signal for producing waveforms (hereinafter referred to as waveforms of PWM phase) marked with the symbol PWM in FIG. 4C is constant (e.g., 70%). FIGS. 8A and 8B show a relationship between back electromotive force B-EMF in that case and the duty of a control signal for producing waveforms of SP phase. FIG. 8A shows the duty of PWM phase at the left scale and the duty of SP phase in a direction opposite to PWM phase at the right scale, representing changes in PWM phase duty (constant) and SP phase duty, correspondingly to the respective scales.

In FIG. 8, in an electrical angle of 90 degrees, the back electromotive force of U phase is zero, just in the middle of the back electromotive forces of V phase and W phase. At this time, V phase is PWM phase, U phase is SP phase, and V phase is a phase (hereinafter referred to as F phase) driven into full amplitude. Accordingly, the duty of U phase, which is SP phase, is 65% of a complement D1 (=100−D0/2) for 100% of just the half (D0/2) of the duty (D0 (=70%) of V phase, which is PWM phase. Since waveforms of U phase change to full amplitude in a section from 65% to 100%, the duty may be changed from 65% to 100%. In this embodiment, since duty changes at this time could be linearly made with only small errors, linear changes are alternatively employed to simplify control.

If a waveform of U phase reaches duty 100% at 120 degrees, thereafter, U phase is switched to the F phase of full amplitude driving, W phase, which has been hitherto F phase, is switched to SP phase, and the duty of the control signal is linearly changed from 100% to 65%. Phase switching is made again at an electrical angle of 150 degrees such that V phase, which has been hitherto PWM phase, is switched to SP phase, the duty of the control signal is linearly changed from 65% to 100%, W phase, which has been SP phase, is switched to F phase, and U phase, which has been F phase, is switched to PWM phase; this is continued up to an electrical angel of 180 degrees. At an electrical angle of 180 degrees, F phase, which has been hitherto F phase, is switched to SP phase, the duty of the control signal is linearly changed from 100% to 65%, and V phase, which has been SP phase, is switched to F phase. At this time, U phase is left to be PWM phase.

Figure 8C:
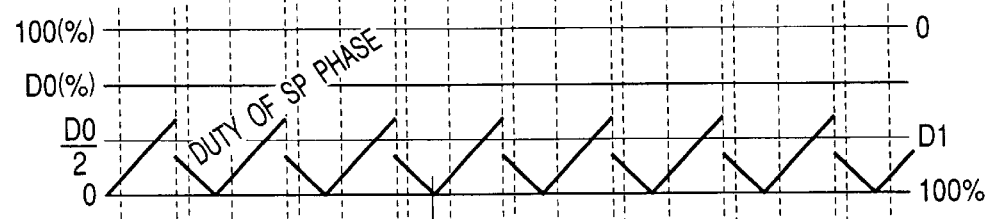

The above waveforms are true for the case where coil back electromotive force B-EMF and coil voltage Vcoil are not out of phase with each other. If coil back electromotive force B-EMF and coil voltage Vcoil are out of phase with each other, the waveforms are formed as shown in FIG. 8C. That is, with the same tilt as the tilt of duty change of each SP phase in FIG. 8B, a starting point is advanced by phase Δθ to control the duty of each SP phase. By this arrangement, the phase of a coil voltage Vcoil of each phase leads the phase of back electromotive force B-EMF and coil current Icoil is driven in phase with back electromotive force B-EMF, so that the greatest torque can be produced.

In the case of FIG. 8B, phase switching takes place at electrical angles of 30, 90, 150, 210, 270, and 330 degrees, and these points correspond to zero-cross points of back electromotive force B-EMF. For this reason, phase switching at these points may cause noise to occur in back electromotive force and disable correct detection of zero-cross points. Accordingly, as shown in FIG. 8D, it is desirable to control duties so as to delay phase switching timing by Δoffset (e.g., an electrical angle 7.5 degrees).

Figure 8D:
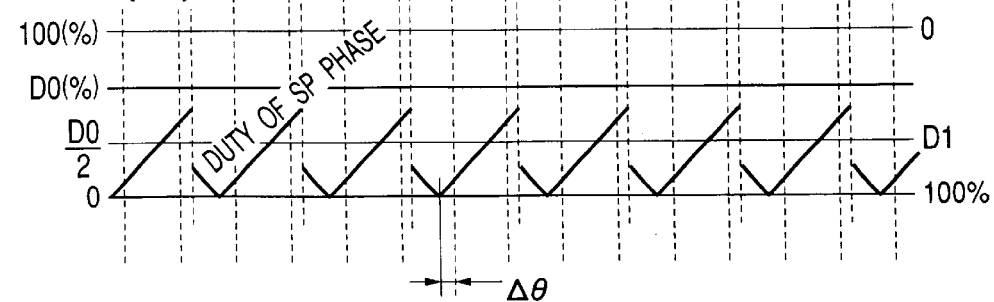

Since a V-shaped waveform of FIG. 8D highly resembles a waveform of SP phase in a range from 100 to 160 degrees in FIG. 4C, it is understood that a waveform similar to a desired waveform (sine waveform as viewed from the center tap) can be produced by the above described duty control method. It can be easily determined that waveforms of SP phase in other portions, which are vertically symmetrical, can be realized by reversing the positive/negative relationship of the above described duty control. In the motor driving control circuit of the embodiment of FIG. 7, the above described duty control is achieved by the arithmetic circuit 23 and a PWM control circuit within the output current control circuit 12 in coordination.

Figure 9:
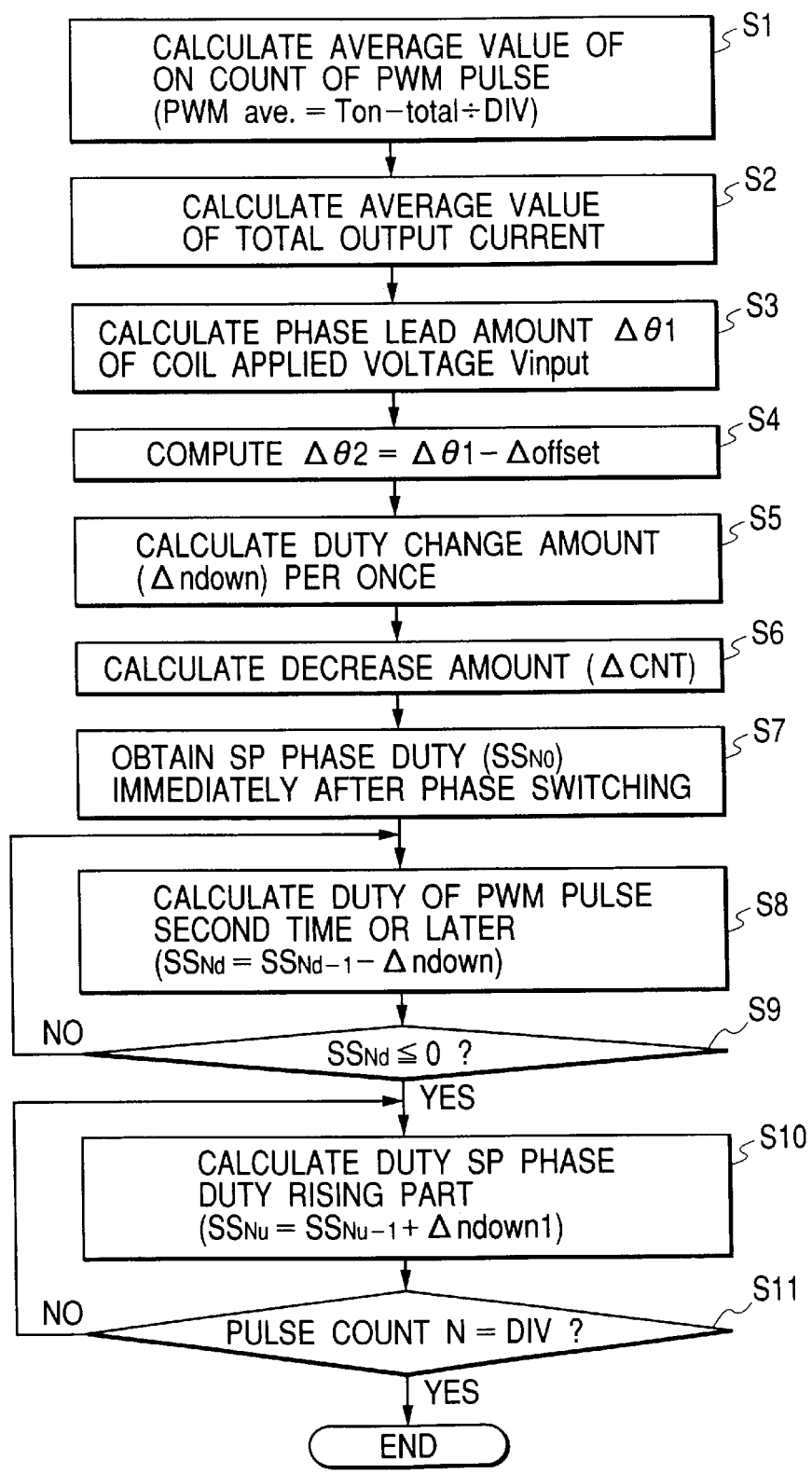
FIG. 9 is a flowchart showing an example of the procedure for producing the duty of SP phase according to the patterns of FIG. 8.
Figure 10:
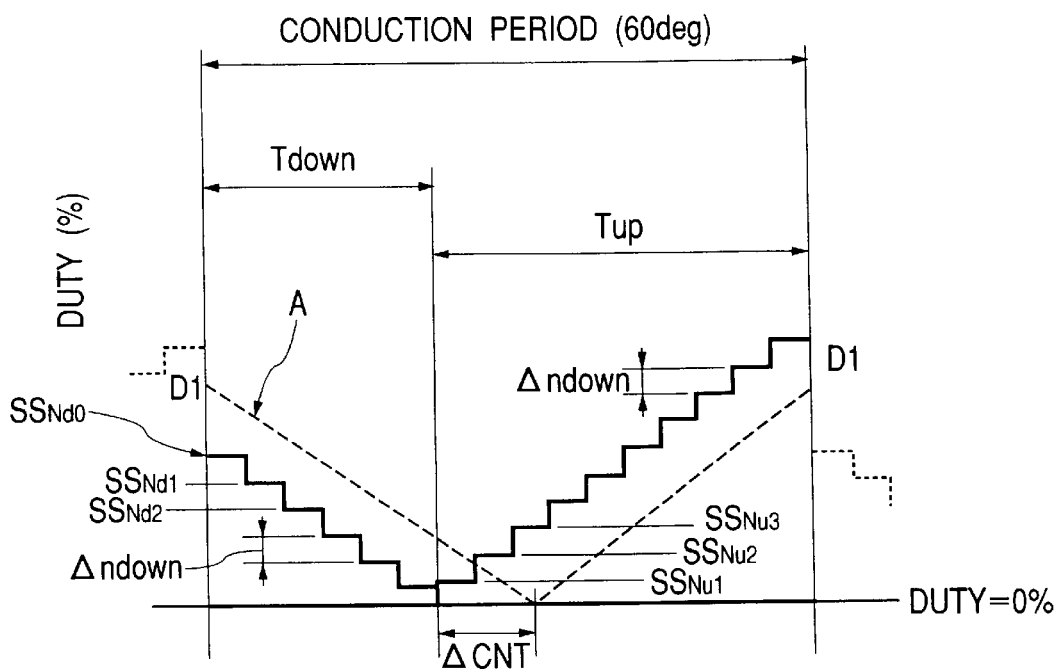
FIG. 10 is a diagram for explaining changes of the duty of SP phase produced according to the procedure of FIG. 9.

Next, the procedure of operations in the arithmetic circuit 23 for producing waveforms of the above SP phase is described using a flowchart of FIG. 9. The meanings of variables used in the procedure by the flowchart are shown in FIG. 10. As seen from FIG. 10, PWM control following the flowchart is not continuous but is performed in 16 stages according to 16 PWM pulses in one conduction period (electrical angle of 60 degrees). The number of PWM pulses in one conduction period is arbitrary.

The PWM control circuit, which produces a predetermined number (e.g., 16) of PWM pulses in a conduction period of each phase and applies them to an output transistor, successively adds on time (e.g., high level period) of the 16 PWM pulses in one conduction period to find total on time Ton-total, and calculates an average value PWMave by dividing the total time (Ton-total) by the number of pulses DIV at phase switching (step S1). An output value of the AD conversion circuit 14 in one conduction period is successively added and the total of them is divided by the number of pulses DIV at phase switching to find an average value Itotalave of a total output current (step S2).

Next, a coefficient CIADJ (=Δθ/Itotal) inputted from the CPU via a serial port and the average output current Itotalave calculated in step S2 are multiplied to obtain a phase lead amount Δθ1 of an applied voltage Vinput applied to a coil (step S3). Δθ and Itotal, instead of the coefficient CIADJ, may be given from the CPU to obtain a coefficient by operations in the motor driving control circuit.

In the next step S4, a value Δθ2 (=Δθ1−Δoffset) is calculated by subtracting a delay amount Δoffset of phase switching timing from zero-cross point from the phase lead amount $\Delta\theta 1$ obtained in step S3. The average value PWMave of total on time of PWM pulses calculated in step S1 is divided by the number of pulses DIV to obtain an average duty change amount $\Delta$ndown (=PWMave/DIV) per PWM pulse. In the next step S6, the average duty change amount $\Delta$ndown obtained in step S5 is multiplied by $\Delta\theta 2$ obtained in step S4 to find an decrease amount $\Delta$CNT from the average value PWMave of total on time of PWM pulses.

The average value PWMave of total on time of PWM pulses is halved to obtain a loopback point duty (D1 of FIG. 8B) of the SP phase in the case where it is assumed that there is no phase lag, and the value is subtracted by the decrease amount $\Delta$CNT obtained in step S6 to calculate the duty SSN0 of a PWM pulse applied to a first SP phase after phase switching (step S7). Thereafter, the duty of PWM pulse a second time or later, namely, on time SSNd is decided by subtracting the change amount $\Delta$ndown obtained in step S5 from on time SSNd−1 of a previous PWM pulse (step S8).

In the next step S9, it is judged whether on time SSNd decided in step S8 is equal to or smaller than 0, and step S8 is repeated until SSNd is equal to or smaller than 0, whereby the duties of SP phase in a down period indicated by the symbol Tdown in FIG. 10 are successively outputted. If on time SSNd is equal to or smaller than 0, control is transferred to step S10, where a predetermined change amount $\Delta$ndown1 is added to on time SSNu−1 of the previous PWM pulse to decide the duty of the next PWM pulse, namely, on time SSNu.

In the next step S11, it is decided whether the number N of produced pulses reaches the number DIV of pulses in one conduction period, and step S10 is repeated until N and DIV match, whereby the duties of SP phase in an up period indicated by the symbol Tup in FIG. 10 are successively outputted. A line indicated by a dashed line A is a duty change line of the SP phase in the case where it is assumed that there is no phase lag, and corresponds to the waveform in FIG. 8B. The duties SSNd and SSNu calculated in the steps S8 and S10 are all outputted as one's complement numbers (1−SSNd) or (1−SSNu). This is done to convert duties calculated at the left scale of FIG. 8 to the right scale.

Figure 11A:
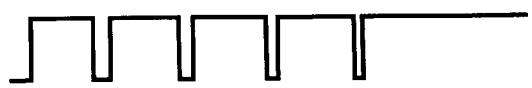
FIG. 11 is a diagram showing waveforms of a PWM signal supplied to an output transistor driving a coil of SP phase produced according to the procedure of FIG. 9.
Figure 11B:

FIG. 11A shows PWM pulses in the down period Tdown of the SP phase of FIG. 10 produced based on the duty SSNd calculated in step S8 of FIG. 9, and FIG. 11B shows PWM pulses in the up period Tup of the SP phase of FIG. 10.

The PWM pulses of FIG. 11A are applied to the gate terminal of an output transistor (N-MOS) of the Vcc side driving the coil (Lv) forming SP phase in a period from 37.5 to 55 degrees of FIG. 4C. If the transistor is P-MOS, inversion signals of the PWM pulses of FIG. 11A are applied to the gate terminal. The PWM pulses of FIG. 11A are applied to the gate terminal of an output transistor (NMOS) of the GND side driving the coil (Lu) forming SP phase in a period from 97.5 to 115 degrees of FIG. 4C.

The PWM pulses of FIG. 11B are applied to the gate terminal of an output transistor (N-MOS) of the Vcc side driving the coil (Lu) forming SP phase in a period from 55 to 97.5 degrees of FIG. 4C. If the transistor is P-NOS, inversion signals of the PWM pulses of FIG. 11B are applied to the gate terminal. The PWM pulses of FIG. 11B are applied to the gate terminal of an output transistor (N-MOS) of the GND side driving the coil (Lw) forming SP phase in a period from 115 to 157.5 degrees of FIG. 4C. By the above described method, waveforms of SP phase that are vertically symmetrical can be formed according to an identical procedure, using identical values.

Figure 12:
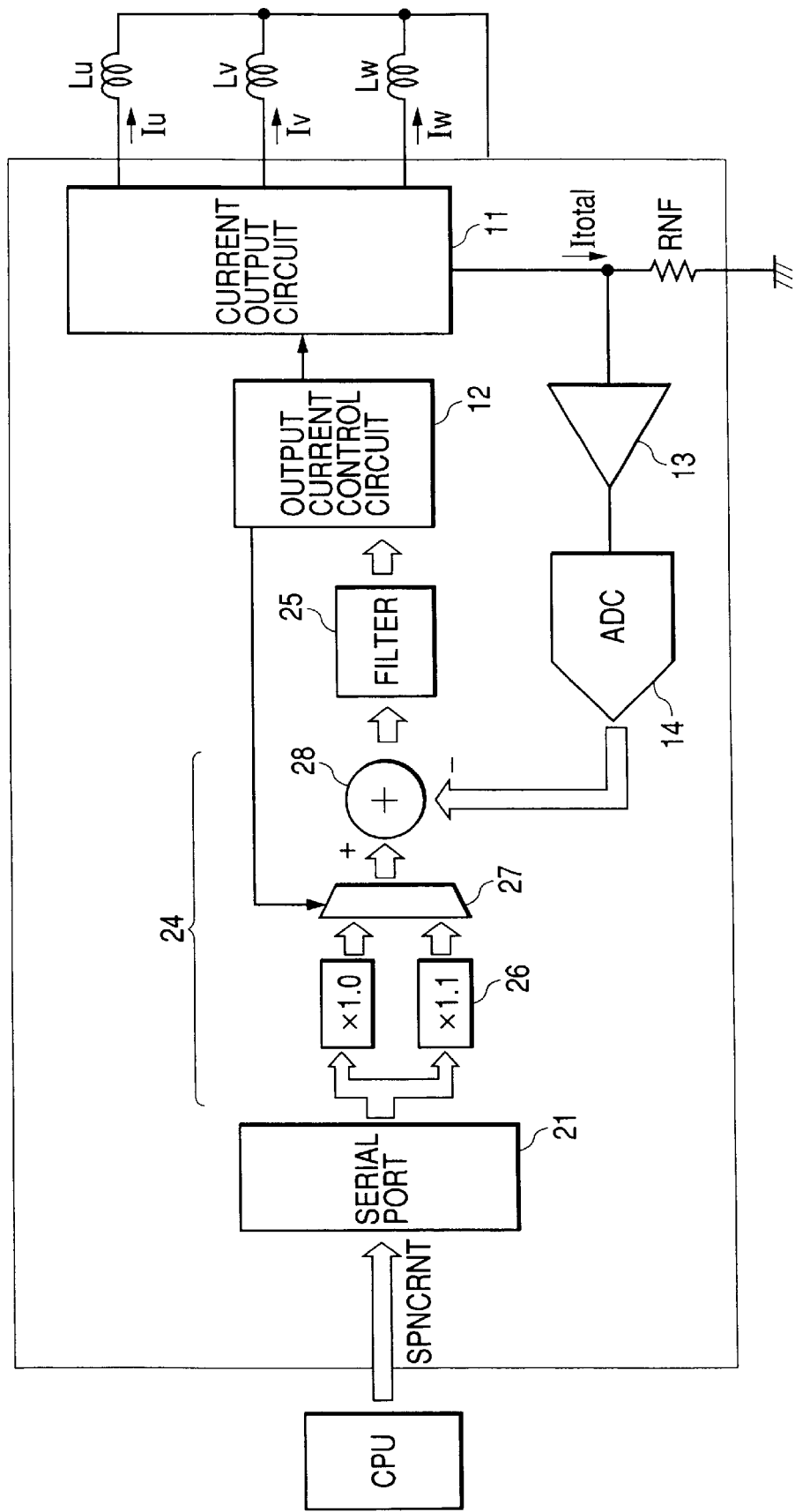
FIG. 12 is a block diagram showing major parts of a second embodiment of a three-phase brushless motor driving control circuit to which the present invention is applied.

FIG. 12 shows a configuration of major parts of a motor driving control circuit in a second embodiment of the present invention.

Figure 13B:
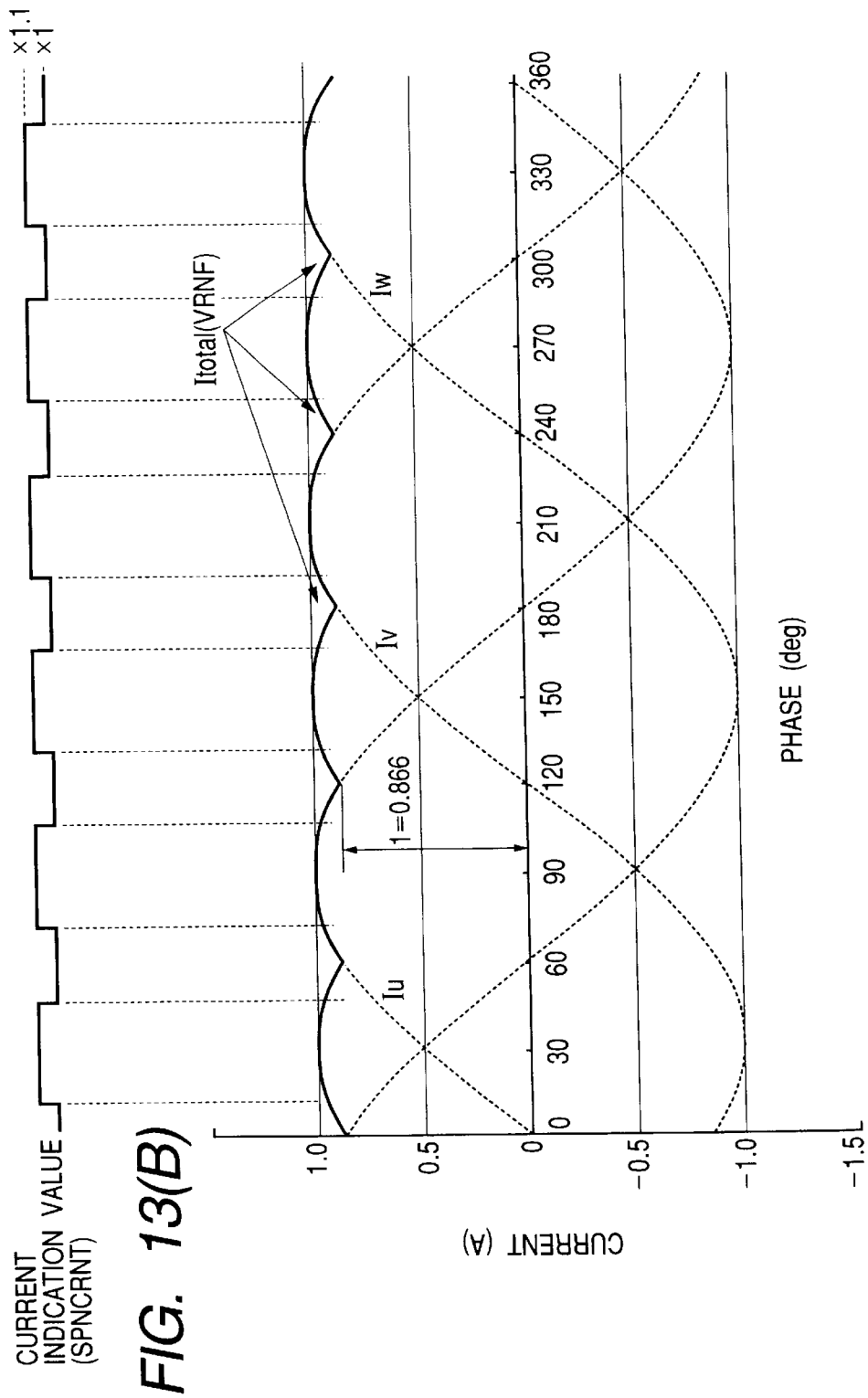
FIG. 13 is a timing diagram showing a relationship between a current indication value and current fluctuations developing when the motor coils are driven with sine waveforms, in the second embodiment of the three-phase brushless motor driving control circuit to which the present invention is applied.

As described previously, the motor driving control circuit of the first embodiment is provided with the current detection resistor RNF for detecting a total current flowing through the three coils Lu, Lv, and Lw and the differential amplifier 13, wherein a difference between a detected coil current value and a current indication value supplied from the controller (CPU) outside the drawing is detected, and a PWM signal is produced to drive the output transistor so as to make the difference zero so that output current fed through the coils is subjected to feedback control. On the other hand, in the motor driving control circuit of the present embodiment, since coils of three phases of the motor are driven with three sine waveforms that are 120 degrees out of phase with one another, a total current Itotal flowing through the motor fluctuates and forms a rippled waveform indicated by a solid line B in FIG. 13.

If the total current is detected by the current detection resistor RNF and the differential amplifier 13 and compared with a current indication value SPNCRNT (constant within a short time) given from the CPU, judging that an error occurs, the feedback control system of the output current control circuit 12 reacts to the ripple and changes output current. Since there is a delay in the current control system, torque ripple becomes worse.

Accordingly, in the embodiment of FIG. 12, an error current detecting circuit 24 is provided with a correction arithmetic circuit 26 that corrects a current indication value by multiplying a current indication value SPNCRNT given from the CPU by a coefficient, and a selector 27. The coefficient multiplied by the current indication value SPNCRNT is a value such as, e.g., 1.1, according to average regulation of output current. The selector 27 selects between a value with a current indication value SPNCRNT multiplied by a coefficient and a value with the current indication value SPNCRNT not multiplied by a coefficient and supplies the value to an add circuit 28 that finds a difference between the value and an output of the AD conversion circuit.

Switching timing of the selector 27 can be automatically obtained from phase switching timing of the output current control circuit 12. Specifically, taking delay in the control system into account, the selector 27 may be subjected to switching control so that the selector 27 selects a value with a current indication value SPNCRNT multiplied by a coefficient as in FIG. 13A in accordance with the timing when the AD conversion circuit 14 outputs current values corresponding to ridged portions of the total current Itotal indicated in FIG. 13B, and selects a value with the current indication value SPNCRNT not multiplied by a coefficient in accordance with the timing when the AD conversion circuit 14 outputs current values corresponding to valley portions of the total current Itotal. The coefficient multiplied by the current indication value SPNCRNT may be a value smaller than 1 such as e.g., 0.9, to switch the selector in the reverse timing of the above.

As in this embodiment, by changing the current indication value SPNCRNT according to the fluctuation of coil total current Itotal, reaction of the control system to ripples of coil current can be weakened, with the result that torque ripples resulting from driving the motor with a sine waveform can be reduced. Although, in this embodiment, a current indication value SPNCRNT is changed at two levels, plural correction arithmetic circuits 26 that corrects a current indication value by multiplying a current indication value SPNCRNT by a coefficient may be provided and appropriately selected by the selector 27 according to the fluctuation of total current Itotal so that the current indication value SPNCRNT is changed at three levels or more.

Figure 14:
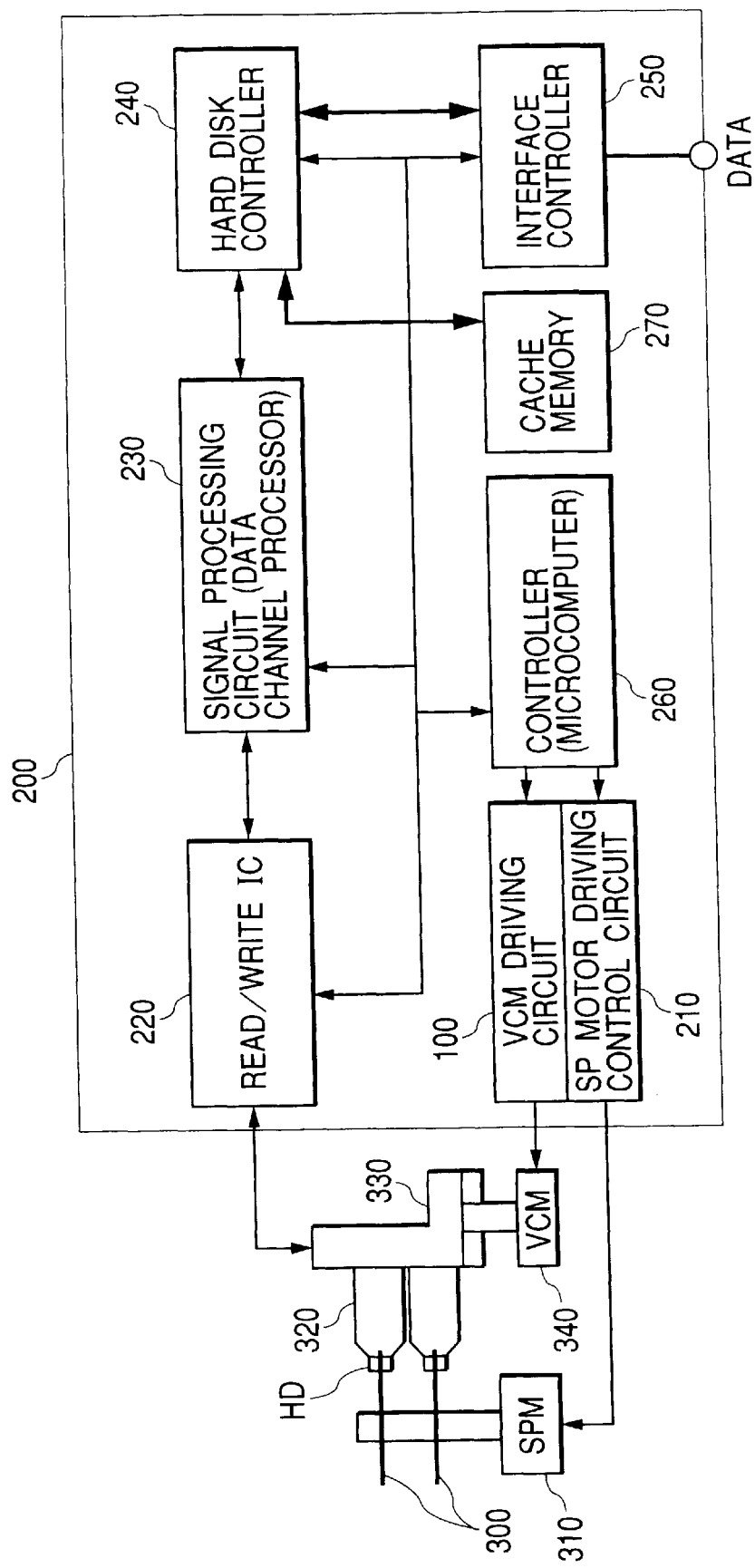
FIG. 14 is a block diagram showing a configuration of a hard disk drive as one example of a system employing the motor driving control circuit to which the present invention is applied.
Figure 15:
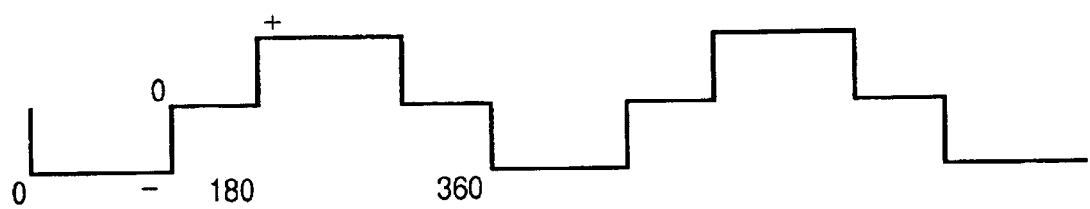
FIG. 15 is a diagram showing an example of a drive waveform applied to coils of individual phases by a driving control circuit of a conventional three-phase brushless motor.

FIG. 14 is a block diagram showing a configuration of a hard disk drive as one example of a magnetic disk system including a spindle motor control system employing a motor driving control circuit to which the present invention is applied, and a magnetic head driving control system.

In FIG. 14, 210 designates a spindle motor driving control circuit, which is configured as shown in FIG. 7, drives and controls the spindle motor 310, and rotates magnetic disk at a predetermined speed. The spindle motor driving control circuit 210 operates according to control signals such as a current indication value SPNCRNT supplied from a controller 260 comprising a microcomputer and performs servo control for the spindle motor 310 so as to keep relative speed of a magnetic head constant.

Reference numeral 320 designates an arm having a magnetic head (including a write magnetic head and a read magnetic head) HD and 330 designates a carriage rotatably holding the arm 320. The voice coil motor 340 moves the carriage 330 to move the magnetic head, and a VCM driving circuit 100 performs servo control for the voice coil motor 340 to align the center of the magnetic head with the center of track.

Reference numeral 220 designates a read/write IC that amplifies current corresponding to a magnetic change to send a read signal to a signal processing circuit (data channel processor) 230 or amplifies a write pulse signal from the signal processing circuit 230 to output drive current of the magnetic head HD. Reference numeral 240 designates a hard disk controller that gets read date sent from the signal processing circuit 230 to perform error correcting processing, and performs error-correcting encoding processing for write data from a host to output the result to the signal processing circuit 230. The above described signal processing circuit 230 performs modulation/demodulation processing suitable for digital magnetic recording and signal processing including waveform shaping with magnetic recording characteristics in mind, and reads position information from a read signal of the magnetic head HD.

Reference numeral 250 designates an interface controller that performs data exchange and control between this system and external apparatuses, and the hard disk controller 240 is connected to a host computer such as a microcomputer of a personal computer body via the interface controller 250. Reference numeral 270 designates a cache memory for temporarily storing read data read at high speed from magnetic disk. A system controller 260 comprising a microcomputer judges an operation mode from a signal supplied from the hard disk controller 240, controls various parts of the system according to the operation mode, and calculates a sector position and the like from address information supplied from the hard disk controller 240.

As described above, the present invention made by the inventor has been described in detail based on preferred embodiments. It goes without saying that the present invention is not limited to the above described preferred embodiments, but may be modified in various ways without departing from the spirit and the scope of the present invention. For example, in the motor driving circuit of the above described embodiments, although the sensorless method is employed to detect a rotor stop position and decide a conduction start phase by detecting back electromotive force, a rotor stop position may be detected using a hole sensor or the like. The motor may be not a three-phase motor but multiple-phase motor.

Although, in the embodiments, waveforms of SP phase are produced by operations in an arithmetic circuit, a memory to store data corresponding to waveforms may be provided so that waveforms are produced by successively reading the data from the memory. Moreover, although, in the embodiments, a MOS transistor is used as an output transistor, a bipolar transistor can be used as an output transistor. Moreover, although, in the embodiments, the full-wave driving method is described, the present invention can apply to the half-wave driving method also.

Although the present invention has been described as to application to a motor driver apparatus of a hard disk storage apparatus, which is an application field of the present invention, the present invention is not limited to such a field and can be widely used in a motor driving control apparatus driving brushless motors such as, e.g., a motor for rotating a polygon mirror of a laser beam printer and an axial fan motor.

Effects obtained by typical ones of inventions disclosed by the present patent application are briefly described below.

According to the present invention, currents of sine waveforms can be fed through coils by a relatively small-sized circuit. With this construction, highly dense magnetic storage can be realized with less rotation variations and a magnetic disk unit provided with a spindle motor rotating at a low noise level can be achieved.

What is claimed is:

1. A magnetic disk storage apparatus comprising: a first motor for rotating magnetic disk; a magnetic head for reading information from recording tracks on the magnetic disk; and a first motor driving control circuit for controlling drive currents of the first motor, wherein the first motor is a multi-phase brushless motor in which the potential of a center tap of the multi-phase brushless motor is made to be floating, and wherein a driving control circuit of the first motor performs driving by feedback control so that a coil of one of the phases is driven with an amplitude at which an applied voltage becomes equal to a source voltage, a coil of a second phase is driven with gradually changing voltages so that a current of sine waveform is delivered; and a coil of a third phase is controlled so that a total current flowing through all coils becomes a predetermined current value.

2. The magnetic disk storage apparatus according to claim 1, wherein the first motor driving control circuit includes an arithmetic circuit that produces by predetermined operations a signal driven with gradually changing voltages so that a current of sine waveform is delivered.

3. The magnetic disk storage apparatus according to claim 2, wherein the first motor driving control circuit produces as a PWM signal a signal driven with gradually changing voltages so that a current of sine waveform is delivered.

4. The magnetic disk storage apparatus according to claim 3, wherein the first motor driving control circuit produces as a PWM signal a signal driven with the feedback control.

5. The magnetic disk storage apparatus according to claim 1, wherein coil currents fed through coils of individual phases by the first motor driving control circuit are formed to have phases that are an predetermined electrical angle corresponding to coil inductance and internal resistance ahead of the phases of back electromotive forces induced in the coils.

6. The magnetic disk storage apparatus according to claim 5, wherein the first motor driving control circuit drives coils of individual phases so that phase switching timing is off zero-cross points of the back electromotive forces.

7. The magnetic disk storage apparatus according to claim 1, wherein the first motor driving control circuit produces signals driven with gradually changing voltages by identical operations even if phases driven by the signals are different from each other so that currents of sine waveforms are delivered.

8. The magnetic disk storage apparatus according to claim 1, including the first motor driving control circuit and a controller controlling the first motor driving control circuit, wherein the first motor driving control circuit is constructed to perform control so that the total of currents fed through the coils of the phases matches a current indication value supplied from the controller, and includes a current indication value correcting circuit that corrects the current indication value, taking into account fluctuations of the total current produced by the currents fed through the coils of the phases being changed according to sine waveforms.

9. The magnetic disk storage apparatus according to claim 1, wherein the first motor is a three-phase brushless motor.

* * * * *